Patented July 15, 1941

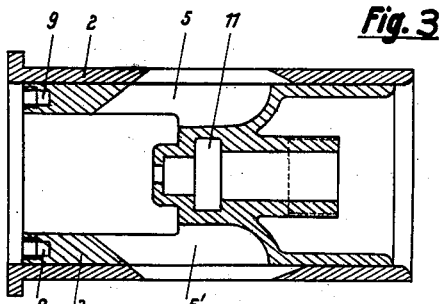
Fig. 3
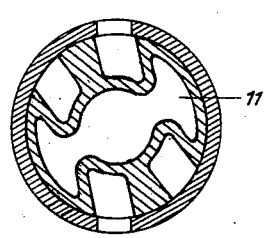
Fig. 3ª
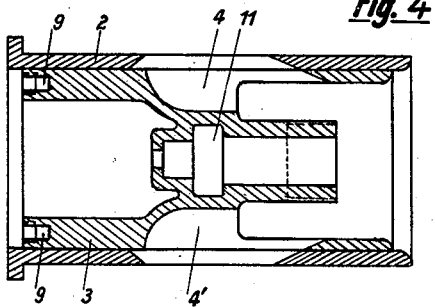
Fig. 4
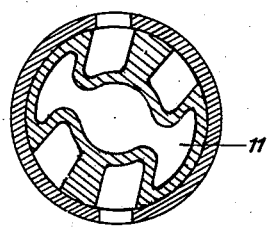
Fig. 4ª
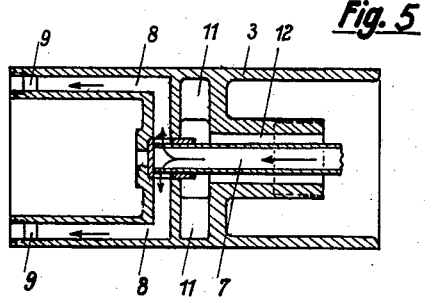
Fig. 5
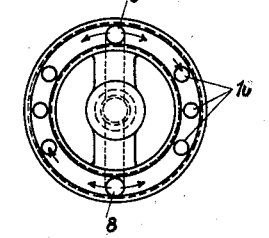
Fig. 5ª
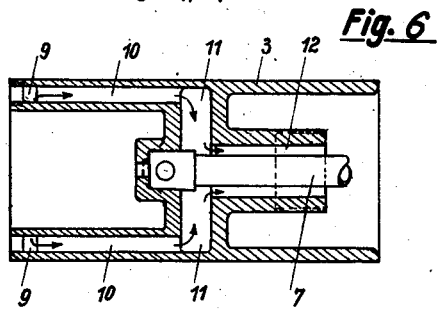
Fig. 6
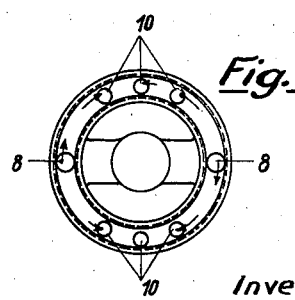
Fig. 6ª

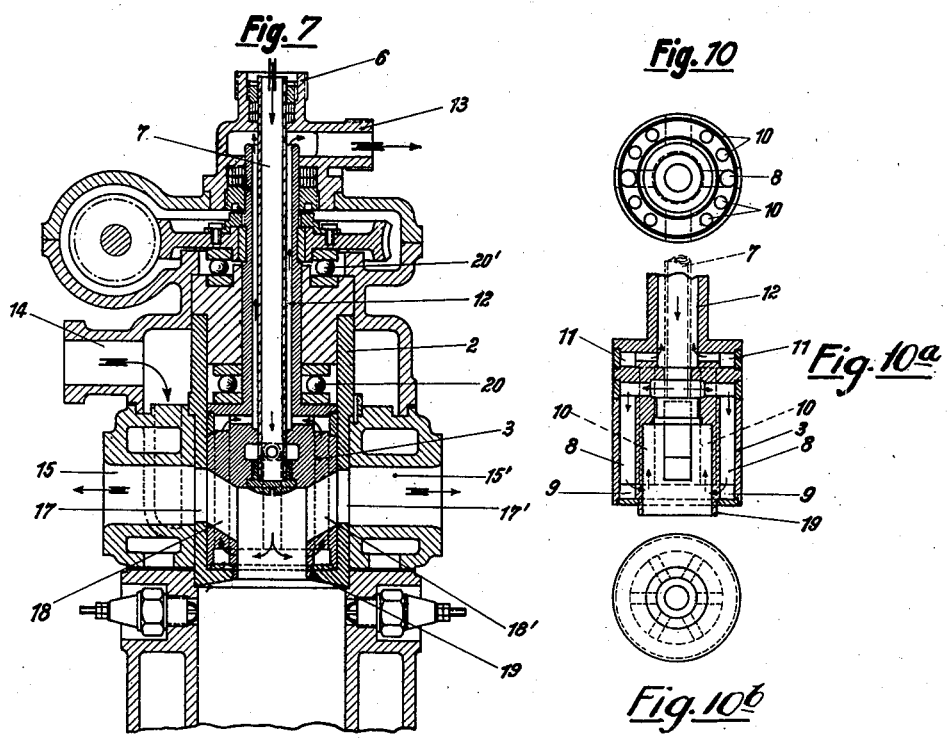
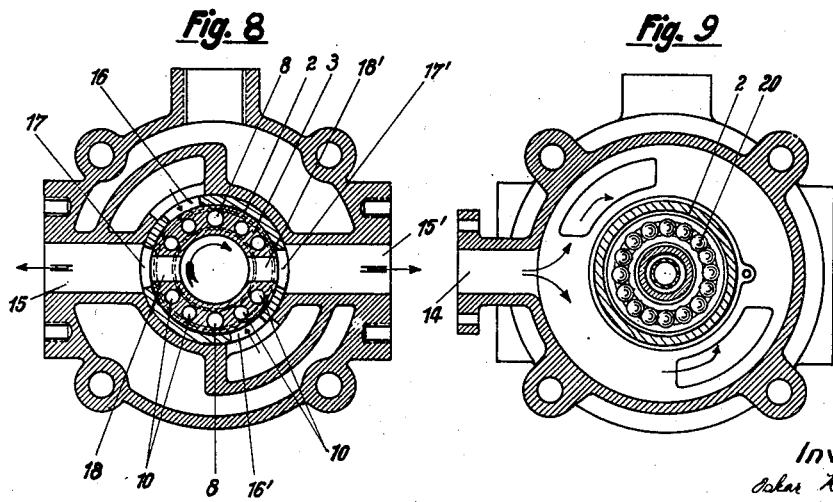

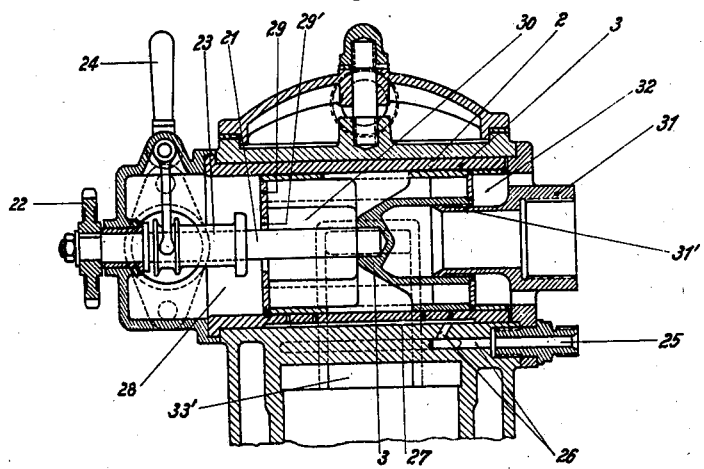
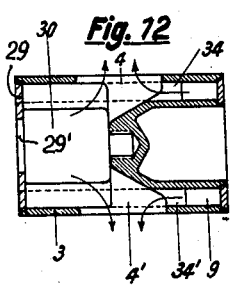
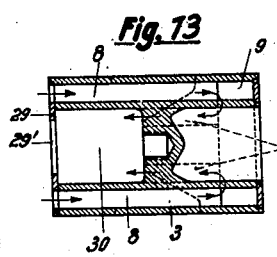
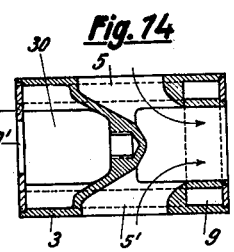
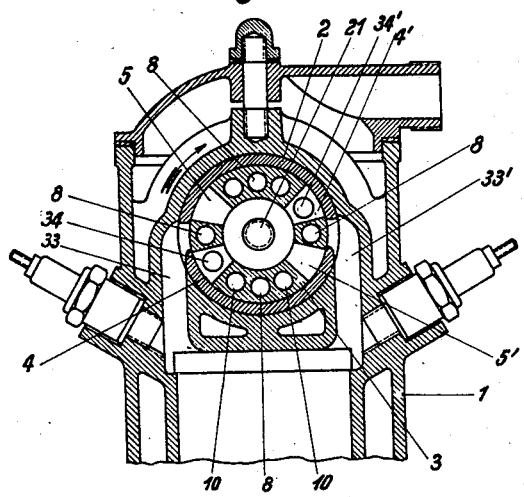

2,249,143

UNITED STATES PATENT OFFICE 2,249,143

CONTROL GEAR FOR EXPLOSION OR INTERNAL COMBUSTION ENGINES

Oskar Kiesel, Munich, Germany, and Hans Arquint, Sursee, Switzerland

Application June 24, 1939, Serial No. 280,918
In Germany June 27, 1938

3 Claims. (Cl. 123—190)

This invention relates to a control gear for explosion or internal combustion engines with rotary valve mounted in the cylinder head and controlling the admission and exhaust.

The nature of the invention consists in that the rotary valve is sufficiently, reliably and uniformly cooled while the engine is running, so that an excessive expansion or deformation of the valve cannot occur. Water, oil, air or fresh gas sucked in by the engine, or in the case of internal combustion engines (Diesel engines) the air for combustion sucked in, may be used for cooling the rotary valve.

The rotary valve constructed according to the invention may be horizontally or vertically mounted in the cylinder head.

Three embodiments of the invention are illustrated by way of example in the accompanying drawings, in which:

Fig. 1 is a vertical longitudinal section through a cylinder head with horizontally arranged rotary valve, Fig. 2 shows the cylinder head in vertical cross-section, Fig. 3 is a longitudinal section of the rotary valve with its liner in exhaust position, Fig. 3a is a cross-section of Fig. 3, Fig. 4 shows the same valve with liner in suction position, Fig. 4a is a cross-section of Fig. 4, Fig. 5 shows the rotary valve in section and the feed of the cooling medium, Fig. 5a is a cross-section of Fig. 5, Fig. 6 is a section through the rotary valve and the return conduit for the cooling medium, Fig. 6a is a cross-section of Fig. 6, Fig. 7 shows a cylinder head with vertical valve, Fig. 8 shows the valve vertically arranged in horizontal section, Fig. 9 is a horizontal section with the gas feed, Fig. 10 is a bottom plan view of Fig. 10a, Fig. 10a is a longitudinal section of the rotary valve taken through the cooling passages, Fig. 10b shows the radially arranged return conduit in dash lines, Fig. 11 is a longitudinal section through a cylinder head with cooling by the fresh gas or air from combustion drawn in, Fig. 12 shows the rotary valve in longitudinal section with path of the mixture drawn in, Fig. 13 shows the same valve in longitudinal section and the path of the gas drawn in, Fig. 14 is a longitudinal section of the same valve in the exhaust position, Fig. 15 is a vertical section through the cylinder head according to Fig. 11 with all passages arranged in the valve.

All the forms of construction illustrated show rotary valves for internal combustion engines with reciprocating piston, for example for explosion or combustion engines, which are driven in a ratio of 1:4 that is with a quarter of the speed of the crank shaft, so as to obtain a low peripheral speed of the rotary valve, the shape of the rotary valve may be absolutely symmetrical. The operation of such a rotary valve is the same in all forms of construction and known in principle.

According to Figs. 1 and 2 an exchangeable control liner 2 is inserted in a cylinder head 1 and secured against rotation. The valve 3 rotates in this liner 2. This valve has two suction slots 4 and 4' (see also Fig. 4) and two exhaust slots 5 and 5' (Fig. 3) in symmetrical arrangement, the suction slots 4, 4' being separate from the exhaust slots 5, 5'. The cooling medium necessary for cooling the exhaust side is conducted in the direction of the arrows, from the admission branch 6 through two bores or passages 8 (shown in dash lines in Fig. 2) to the annular passage 9 (see also Fig. 5), whence the return flow takes place through for example six bores 10 (Figs. 2 and 6) into the intermediate or front chamber 11 and flows off through the hollow driving shaft 12 to the discharge branch 13 in the direction of the arrows. (See also Fig. 6.) The important factor is that by this arrangement the control valve rotating during the running of the engine is cooled absolutely uniformly on its entire periphery.

Figs. 3, 4, 5 and 6 show different sections of this rotary valve from which the symmetrical construction of the valve and the path of the cooling medium is still more clearly visible; in Figs. 3, 4, 5 and 6 the same reference numerals are used as in Figs. 1 and 2.

As can be seen from Fig. 7, the same rotary valve with this cooling arrangement can also be arranged vertically. Thus, for example the cooling medium is introduced through the connection branch 6 in the direction of the arrows through the feed conduit pipe 7 which participates in the rotation, and then passes along the path indicated by arrows and flows back through the hollow driving shaft 12 to the discharge branch 13. The fuel mixture or combustion air is introduced through the connection branch 14 whereas the waste gases from combustion are expelled in the direction of the arrows through the passages 15 and 15'.

For controlling the necessary four strokes the stationary valve liner 2 according to Figs. 7 and 8 has two suction slots 16 and 16' and two exhaust slots 17 and 17' whereas the cooled rotary valve 3 has two opposite symmetrical control slots 18 and 18'.

A very important point in the vertical valve construction according to Fig. 7 is, that the valve has at its lower end, that is the end directed towards the compression and explosion chamber, a good fitting guide edge 19 which runs in the liner 2 and consequently protects the under side of the valve 3 from soiling and also from too great oil wear. As in this construction shown in Fig. 7 the rotary valve 3 receives the full pressure of the compression and explosion chamber, two thrust ball bearings 20 and 20' are provided for taking up the pressure and distancing the valve.

Fig. 8 shows the same cylinder head as Fig. 7 in horizontal section, from which the direction of rotation, and the conduit passages and also the exhaust conduits may be seen.

Fig. 9 shows a horizontal section through the middle of the gas or air suction chamber with course of flow to the control liner 2; the thrust ball bearing 20 is also shown in top plan view.

Fig. 10 shows the rotary valve in longitudinal section; above which there is a bottom plan view with removed closing ring and the cooling conduits 8 and 10; the view underneath the longitudinal section shows the radially arranged return conduit in dash lines.

Figure 1:
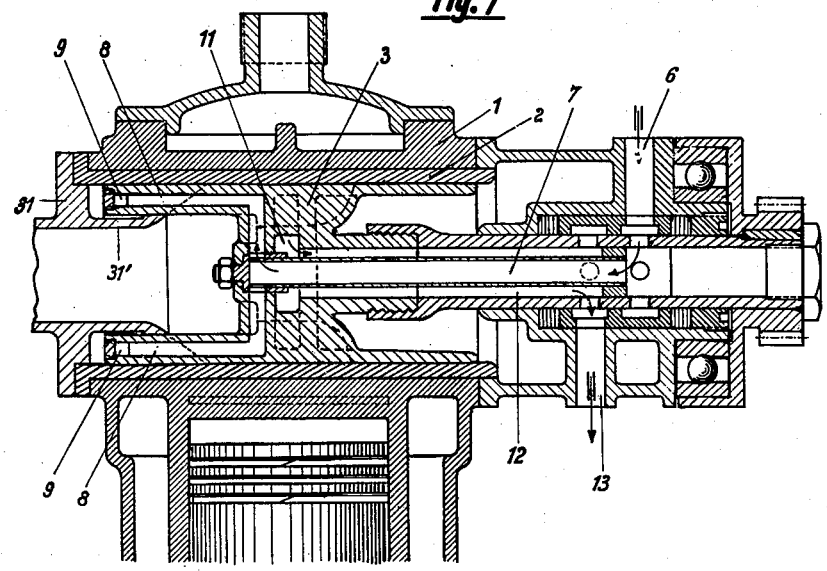
Figure 2:
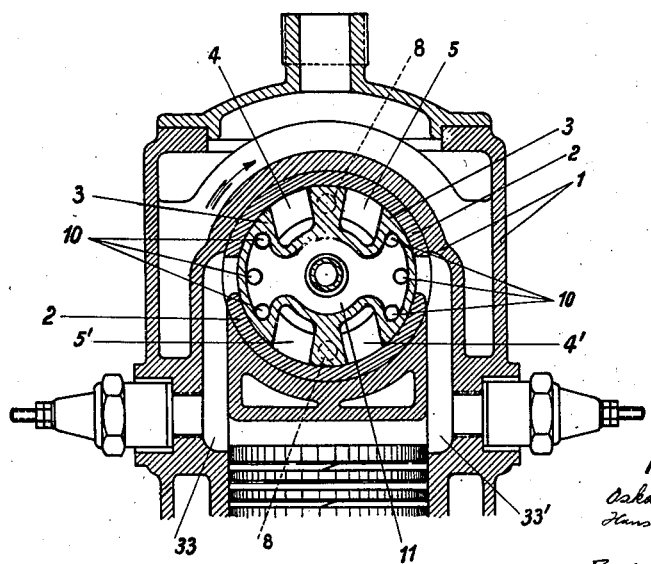

In the form of construction according to Fig. 11 the cooling is effected by the gas mixture or combustion air drawn in. In the, for example water-cooled, cylinder head the rotary valve 3 is arranged in a stationary control liner 2 and further a driving shaft 21, a driving wheel 22, a slide sleeve 23 and an operating lever 24. The feed of the necessary lubricating oil is effected through the connection nozzle 25 and the bores 26 to the groove 27 in the stationary liner 2, whence the valve 3 receives the lubricating oil it requires, for example through four bores.

The gas mixture or air for combustion is sucked from the annular chamber 28, whereas the exhaust gases pass out through the connection branch 31.

The section Fig. 12 and the arrows show how the gas, when the rotary valve 23 is open, is sucked in partly directly (at 4) and partly indirectly through the bores 8 (see Fig. 13), the annular chamber 9 and the bores 10 so that the valve is uniformly cooled on its entire periphery.

In Fig. 14 the rotary valve is shown in exhaust position and the path of the exhaust gases (at 5) is indicated by arrows.

Fig. 15 shows in vertical section the stationary control liner 2 and the necessary connecting passages 33 and 33' between the control liner 2 and the compression and explosion chamber, which passages lead to the passage apertures of the control liner 2.

This section through the rotary valve 3 also shows the cooling conduits 8 for the fresh air or the gas air mixture sucked in, a portion of the drawn in gas in the control slots 4 and 4' which control the suction, being sucked through short bores 34 and 34' out of the annular passage 9 arranged behind them. The exhaust is controlled by the valve slots 5 and 5'.

From the construction illustrated in Fig. 15 it can be seen that such a rotary control valve is relieved from pressure on all sides during the operation, because all pressures acting on it are mutually balanced; also that the cooling passages are uniformly distributed and near the periphery, and that the valve is symmetrically constructed and consequently cooled in the most uniform manner imaginable.

The rotary valve 3 has, on the side facing the gas admission chamber 28, a flat closing ring 29 with a predetermined clearance around the driving shaft 21. Thus, in the case of high speed engines, it is possible to cover the existing annular gap 29' with the sliding sleeve 23 and the lever 24 at small engine outputs, so that at small and medium outputs the whole of the gas sucked in by the engine is drawn, for the purpose of cooling, through the conduits 8, 9, 10 and 34 into the space 30, whence it is distributed to the interior of the cylinder by the control slots 4 of the rotary valve 3. In the case of high outputs, it is necessary to produce an addiional gas feed cross-section on the suction side, this being effected by bringing the sliding sleeve 23 out of its closing position into its open position by means of the lever 24, so that the gas necessary for running at full charge can flow through the annular passage 29' into the space 30, a portion of the fresh gas or air from combustion drawn in flowing, however, continually through the passages 8, 9, 10 and 34 of the control rotary valve 3. On the exhaust side a corresponding flange 31 is provided for the pipe connection which, by means of bores or ports, connects with the atmosphere an annular space 34 behind the valve 3, whereas a thin-walled pipe connection 31' effects the discharge proper of the exhaust gases and the necessary packing.

We claim:

1. In a distribution valve for internal combustion engines, a rotary valve arranged transversely in the cylinder head of the engine and having admission and exhaust control slots, said valve having in its periphery on the suction side open bores, on the exhaust side an annular chamber and additional bores, the gas mixture being drawn from the suction side through the first mentioned bores into the annular chamber and into the last mentioned bores before entering the cylinder through the admission slots, thereby uniformly cooling the valve on its entire periphery.

2. In a distribution valve for internal combustion engines, a rotary valve arranged transversely in the cylinder head of the engine and having admission and exhaust control slots, said valve having in its periphery on the suction side open bores, on the exhaust side an annular chamber and additional bores, the gas mixture being drawn from the suction side through the first mentioned bores into the annular chamber and into the last mentioned bores before entering the cylinder through the admission slots, thereby uniformly cooling the valve on its entire periphery, a driving spindle carrying said valve, a second rotary valve on said spindle, a ring between said two valves and surrounding said spindle and forming therewith an annular slot, and means for shifting said second valve to close said annular slot to cause a portion of the gas mixture to be sucked directly through the admission slots.

3. In a distribution valve for internal combustion engines, a rotary valve arranged transversely in the cylinder head of the engine and having admission and exhaust control slots, said valve having in its periphery on the suction side open bores, on the exhaust side an annular chamber and additional bores, the gas mixture being drawn from the suction side through the first mentioned bores into the annular chamber and into the last mentioned bores before entering the cylinder through the admission slots, thereby uniformly cooling the valve on its entire periphery, the cylinder head having connecting passages on each side of the valve and extending to the middle thereof and adapted to relieve the valve from all pressures.

HANS ARQUINT.
OSKAR KIESEL.